(12) United States Patent
Takayama et al.

(10) Patent No.: US 7,652,079 B2
(45) Date of Patent: Jan. 26, 2010

(54) POLYBUTYLENE TEREPHTHALATE RESIN COMPOSITION FOR VIBRATION WELDING

(75) Inventors: Katsunori Takayama, Shizuoka (JP); Takayuki Ishikawa, Shizuoka (JP)

(73) Assignee: Wintech Polymer Ltd., Tokyo (JP)

( * ) Notice: Subject to any disclaimer, the term of this patent is extended or adjusted under 35 U.S.C. 154(b) by 724 days.

(21) Appl. No.: 11/298,653

(22) Filed: Dec. 12, 2005

(65) Prior Publication Data
US 2006/0142423 A1 Jun. 29, 2006

(30) Foreign Application Priority Data
Dec. 24, 2004 (JP) ............................. 2004-372655

(51) Int. Cl.
*C08G 59/50* (2006.01)
*C08F 283/02* (2006.01)
(52) U.S. Cl. ...................... 523/400; 523/445; 524/404; 524/513
(58) Field of Classification Search ................. 523/400, 523/445; 524/404, 513
See application file for complete search history.

(56) References Cited

U.S. PATENT DOCUMENTS

| | | | | |
|---|---|---|---|---|
| 5,367,013 A | * | 11/1994 | Ohmae et al. ............... | 524/494 |
| 2001/0016263 A1 | * | 8/2001 | Doteguchi et al. .......... | 428/458 |
| 2004/0147635 A1 | * | 7/2004 | Maekawa ................... | 523/200 |

FOREIGN PATENT DOCUMENTS

| JP | 2000-290476 | 10/2000 |
|---|---|---|
| JP | 2001-026656 A | 1/2001 |
| JP | 2002-212377 | 7/2002 |
| JP | 2002-322340 | 11/2002 |

OTHER PUBLICATIONS

Vijay K. Stokes; The Vibration Welding of Poly(Methyl Methacrylate) to Itself and to Polycarbonate, Poly(Butylene Terephthalate), and Modified Poly(Phenylene Oxide); J.Adhesion Sci. Technol.; 2001; pp. 457-466; vol. 15-No. 4.
V.K. Stokes; "Vibration Welding of Thermoplastics. Part I: Phenomenology of the Welding Process"; Polymer Engineering and Science; Mid-Jun. 1988; pp. 718-727; vol. 28-No. 11.
V.K. Stokes; "Vibration Welding of Thermoplastics. Part II: Analysis of the Welding Process"; Polymer Engineering and Science; Mid-Jun. 1988; pp. 728-739; vol. 28-No. 11.

* cited by examiner

*Primary Examiner*—Peter D Mulcahy
(74) *Attorney, Agent, or Firm*—Buchanan Ingersoll & Rooney PC

(57) ABSTRACT

The present invention provides a polybutylene terephthalate resin composition which has an excellent vibration welding performance, an excellent resistance to heat shock, and is useful for a case, housing and the like of electric/electronic parts. Specifically, it provides a polybutylene terephthalate resin composition for vibration welding comprising (A) 100 parts by weight of a polybutylene terephthalate resin; (B) 20 to 100 parts by weight of a modified polyester copolymer containing 5 to 30% by mole of a comonomer; (C) 5 to 30 parts by weight of an elastomer selected from an acrylic-based copolymer having a glycidyl group and/or an α-olefin.α,β-unsaturated carboxylic acid (ester).α,β-unsaturated carboxylic acid glycidylester-based ternary polymer; and (D) 60 to 150 parts by weight of a glass fiber.

8 Claims, 1 Drawing Sheet

POLYBUTYLENE TEREPHTHALATE RESIN COMPOSITION FOR VIBRATION WELDING

FIELD OF ARTS

The present invention relates to a polybutylene terephthalate resin composition for vibration welding, and more particularly to a polybutylene terephthalate resin composition which has excellent vibration welding performance, excellent resistance to heat shock, and is useful for case, housing, and the like of electric/electronic parts; and a molded article being formed by vibration-welding the same.

RELATED ARTS

A polybutylene terephthalate resin, which is excellent in mechanical properties, electric properties, and physical and chemical properties, and is favorable in processing, is widely applied for uses such as electric/electronic parts as one of engineering plastics.

Concerning the housing of automobile applications particularly including an ECU (Electrical Control Unit) and a sensor case, because electric parts and substrates are badly affected by dusts and waters, they are generally held in resin cases, potted with water-repellent coats or epoxy resin/silicone, and enveloped with covering members to cope with practical application. For such parts, it is an important issue to ensure that casing members and covering members are airtight. Therefore, there have been practically employed various welding/sealing methods such as adhesion, ultrasonic welding, high-frequency welding, vibration welding, heat plate welding or double molding.

Among these methods, vibration welding has been practically employed as a simple method for mass production, though it is limited in design to apply because it requests two members to have their respective flat frictional surfaces to weld.

On the other hand, in the above electric/electronic parts, a metal insert such as a connecter and a bus bar is frequently used for the molded product for connecting or the molded product to be connected. Therefore, the metal-inserted molding must have an essential performance to be resistant to heat shock. It is well known that addition of a shock resistant improver and the like could improve resistance to heat shock of the molded product per se. With the vibration welding method, however, addition of a shock resistant improver for improving resistance to heat shock, a releasing agent for improving moldability, and a plate-like filler or an amorphous resin for improving dimensional stability, causes remarkable reduction in adhesion in the frictional interface, because the method melts/connects two members by heat generation due to friction of two members. Particularly, a relatively large case having a welding area of beyond 4 $cm^2$ is possibly subjected to repetition of a thermal cycle resulting in easy destruction in the sealing surface.

Concerning the vibration welding technique, conventionally, V. K. STOKES, J Adhes Sci Technol VOL. 15 No. 4 (2001) and Polym Eng Sci VOL. 28 No. 11 (1988) introduced the welding performance of polybutylene terephthalate; where the friction behavior and static strength were analyzed; and the relative merits of a neat polymer or the characteristics and phenomena of linear welding are analyzed. But there has been not yet proposed a practical material for vibration welding.

JP-A2001-26656 proposes a technique that a polyester having a low melting point is used to improve laser welding, but gives no description on whether the polyester has an effect to improve vibration welding. Further, the technique can not be applied to a member in which a high value is placed on the durability of an airtight section in an insert or a case/cover.

JP-A 2000-290476 also proposes a polyester resin composition comprising mainly a specific polyolefin-based compound or polyester-based compound, but the composition can not be practically applied to vibration welding because it is likely to lower heat generation due to friction, though it can be applied to ultrasonic welding where frictional vibration of the member does not give remarkable influence.

JP-A 2002-322340 and JP-A 2002-212377 propose a technique to use a specific elastomer, but do not pay any attention to the durability and the sealability in thermal cycle, and generation of resin abrasion powders in the process. This technique was limited mainly to improvements of the appearance and the static strength.

DISCLOSURE OF THE INVENTION

In view of the above problem in the prior art, an object of the present invention is to provide a polybutylene terephthalate resin composition for vibration welding which succeeds in compatibility between vibration welding and resistance to heat shock.

The present inventors made a detail study to accomplish above-mentioned purpose and to provide a polybutylene terephthalate resin composition for vibration welding which is excellent in vibration welding, resistance to heat shock, and dimensional stability. As a result, it is found out that a composition supplied with a specific copolymer, a specific elastomer, and a glass fiber is very excellent in vibration welding and resistance to heat shock without remarkably lowered mechanical properties. The finding completes the present invention.

Namely, the present invention is a polybutylene terephthalate resin composition for vibration welding, comprising:
 (A) 100 parts by weight of a polybutylene terephthalate resin,
 (B) 20 to 100 parts by weight of a modified polyester copolymer containing 5 to 30% by mole of a comonomer,
 (C) 5 to 30 parts by weight of an elastomer selected from an acrylic-base copolymer having a glycidyl group and/or an α-olefin.α,β-unsaturated carboxylic acid (ester). α,β-unsaturated carboxylic acid glycidylester-base ternary polymer, and
 (D) 60 to 150 parts by weight of a glass fiber; and a molded article being formed by vibration-welding a molding made of the resin composition.

DETAILED DESCRIPTION OF THE INVENTION

The present invention will be described in detail below.
 (A) The polybutylene terephthalate resin (PBT resin), which is the base resin of the resin composition according to the present invention, is a polybutylene terephthalate resin obtained by the polycondensation of a carboxylic acid component comprising at least terephthalic acid or the ester derivative (such as the low alcohol ester) with a glycol component comprising at least an alkylene glycol having a carbon number of 4 (1,4-butane diol) or the ester derivative.

The present invention is not limited in kind or amount of a terminal group of the polybutylene terephthalate, crystallization property, intrinsic viscosity, kind or amount of a polymerization catalyst, and a polymerization method. Any known polybutylene terephthalate is preferably used.

(B) The modified polyester copolymer containing 5 to 30% by mole of a comonomer is a modified polyester copolymer obtained by the partial substitution of a dicarboxylic acid component constituting polyethylene terephthalate-based copolymer and/or polybutylene terephthalate-based copolymer, and comprising at least terephthalic acid or the ester derivative (such as the low alcohol ester) and a glycol component comprising at least an alkylene glycol having a carbon number of 2 and/or 4 (ethylene glycol and/or 1,4-butane diol) or the ester derivative with a copolymerizable monomer (hereinafter, simply referred to as a copolymerizable monomer).

Such copolymerizable monomer includes one or more selected from a dicarboxylic acid excluding terephthalic acid, a diol excluding ethylene glycol and 1,4-butane diol, an oxycarboxylic acid, and a lactone, and they may be used in combination thereof.

The dicarboxylic acid includes a fatty acid dicarboxylic acid (a $C_{4-40}$ dicarboxylic acid, preferably a $C_{4-14}$ dicarboxylic acid such as succinic acid, glutaric acid, adipic acid, pimelic acid, suberic acid, azelaic acid, sebacic acid, undecane dicarboxylic acid, dodecane dicarboxylic acid, hexadecane dicarboxylic acid or dimeric acid), an alicyclic dicarboxylic acid (a $C_{8-12}$ dicarboxylic acid such as hexahydrophthalic acid, hexahydroisophthalic acid, hexahydroterephthalic acid or himic acid), an aromatic dicarboxylic acid excluding terephthalic acid (such as phthalic acid, isophthalic acid, naphtalenedicarboxylic acid such as 2,6-naphtalenedicarboxylic acid, a $C_{8-16}$ dicarboxylic acid such as 4,4'-diphenyldicarboxylic acid, 4,4'-diphenoxy ether dicarboxylic acid, 4,4'-diphenyl ether dicarboxylic acid, 4,4'-diphenylmethanedicarboxylic acid, 4,4'-diphenylketone dicarboxylic acid), or their reactive derivatives (including a lower alkyl ester (including a $C_{1-4}$ alkyl ester of phthalic acid or isophthalic acid such as dimethyl phthalic acid or dimethyl isophthalic acid (DMI)), and a derivative such as an acid chloride or an acid anhydride which can form the ester). Further, a polycarboxylic acid (such as trimellitic acid or pyromellitic acid) may be used together with the above if necessary.

The diol includes an aliphatic alkane diol excluding ethylene glycol and 1,4-butane diol (a $C_{2-12}$ alkane diol, preferably a $C_{2-10}$ alkane diol such as trimethylene glycol, propylene glycol, neopentyl glycol, hexane diol, octane diol, and decane diol), polyoxyalkylene glycol (a glycol having a plurality of oxy $C_{2-4}$ alkylene unit, such as diethylene glycol, dipropylene glycol, ditetramethylene glycol, triethylene glycol, tripropylene glycol, and polytetramethylene glycol), an alicyclic diol (such as 1,4-cyclohexanediol, 1,4-cyclohexane dimethanol or hydrogenated bisphenol A), an aromatic diol (including a $C_{6-14}$ aromatic diol such as hydroquinone, resorcinol and naphthalene diol, biphenol, a bisphenol, xylilene glycol) Further, a polyol such as glycerin, trimethylol propane, trimethylol ethane, and pentaerythritol may be used together if necessary.

The bisphenol includes: a bis (hydroxyaryl) $C_{1-6}$ alkane, such as bis(4-hydroxyphenyl)methane (bisphenol F), 1,1-bis-(4-hydroxyphenyl)ethane (bisphenol AD), 1,1-bis-(4-hydroxyphenyl)propane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl)hexane or 2,2-bis-(4-hydroxyphenyl)-4-methylpentane; a bis(hydroxyaryl)$C_{4-10}$ cycloalkane, such as 1,1-bis(4-hydroxyphenyl) cyclopentane or 1,1-bis(4-hydroxyphenyl)cyclohexane; 4,4'-dihydroxydiphenyl ether, 4,4'-dihydroxydiphenylsulfone, 4,4'-dihydroxydiphenylsulfide, 4,4'-dihydroxydiphenylketone, and their alkyleneoxide adducts. The alkylene oxide adducts include: the $C_{2-3}$ alkylene oxide adduct of a bisphenol (such as bisphenol A, bisphenol AD, bisphenol F), such as 2,2-bis[4-(2-hydroxyethoxy)phenyl]propane, diethoxylated bisphenolA (EBPA), 2,2-bis[4-(2-hydroxypropoxy)phenyl]propane, dipropoxylated bisphenol A. An alkylene oxide (a $C_{2-3}$ alkylene oxide such as ethylene oxide or propylene oxide) has an addition mol number of 1 to 10 mol, preferably about 1 to 5 mol per the hydroxy group.

The oxycarboxylic acid includes the oxycarboxylic acid such as oxybenzoic acid, oxynaphthoic acid, hydroxyphenylacetic acid, glycolic acid, oxycaproic acid, and their derivatives. The lactone includes a $C_{3-12}$ lactone such as propiolactone, butylolactone, valerolactone or caprolactone (such as ε-caprolactone).

Preferable examples of the copolymerizable monomers include a diol including a $C_{2-6}$ alkylene glycol, that is, a straight or branched chain alkylene glycol such as trimethylene glycol, propylene glycol or hexane diol, a polyoxy $C_{2-4}$ alkylene glycol having an oxyalkylene unit at a repeat number of about 2 to 4, such as diethylene glycol or a bisphenol such as bisphenol or an alkyleneoxide adduct thereto, a dicarboxylic acid, including a $C_{6-12}$ aliphatic dicarboxylic acid such as adipic acid, pimelic acid, suberic acid, azelaic acid or sebacic acid, an asymmetric aromatic dicarboxylic acid having an arene ring substituted with carboxyl groups at asymmetric positions to each other and 1,4-cyclohexane dimethanol).

The preferable of these compounds includes the alkylene oxide adduct of an aromatic compound such as a bisphenol (particularly, bisphenol A), and an asymmetric aromatic dicarboxylic acid [including a lower alkylester such as phthalic acid, isophthalic acid, and the reactive derivatives (dimethylisophthalic acid (DMI)].

The practically more preferable is a lower alkylester such as an asymmetric aromatic dicarboxylic acid such as isophthalic acid, and the reactive derivatives (dimethylisophthalic acid (DMI). Isophthalic acid modified polyethylene terephthalate and/or isophthalic acid modified polybutylene terephthalate, which are obtained by polycondensing terephthalic acid, isophthalic acid as a dicarboxylic acid component and a glycol component including a C2 or C4 alkylene glycol (ethylene glycol and/or 1,4-butane diol) or the ester derivative as a diol component, is practically preferably used as (B) a modified polyester copolymer containing 5 to 30% by mole of a comonomer.

The comonomer, if used at a rate of less than 5 mol %, can not provide sufficient vibration welding, and, if used at that of more than 30 mol %, becomes poor in handling property for production, causing the pellets to stick to each others, a burr to generate in a molding process, and a molding cycle to be protracted, with remarkably lowered productivity. The comonomer is preferably used at an amount of 5 to 25 mol %, particularly preferably 5 to 15 mol %.

(B) the modified polyester copolymer containing 5 to 30% by mole of the comonomer is comprised at 20 to 100 parts by weight relative to 100 parts by weight of (A) the polybutylene terephthalate resin. The (B) component, if comprised at less than 20 parts by weight, can not provide sufficient vibration welding, and, if comprised at more than 100 parts by weight, causes a burr to generate in a molding process, and a molding cycle to be protracted, with remarkably lowered productivity, which is not desirable from practical viewpoints.

The elastomer selected from an acrylic-based copolymer having a glycidyl group and/or an α-olefin.α,β-unsaturated carboxylic acid (ester).α,β-unsaturated carboxylic acid glycidylester-based ternary polymer, which are used as (C) the component in the present invention, will be described.

The acrylic-based copolymer having a glycidyl group has a multilayer structure in which the inner layer is made of an acrylic-base elastomer and the outer layer is made of a vinyl-base (co)polymer, where an acryl core shell polymer with the outer layer having a glycidyl group is preferably used.

For the inner layer made of the acrylic-base copolymer, an acrylic-base elastomer is used, and a copolymerized/graft-polymerized product of a silicon-base elastomer also may be used. The acrylic-base elastomer is produced by polymerizing an acrylic acid ester such as butyl acrylate with a small amount of a crosslinking monomer such as butylene diacrylate. The above acrylic acid ester includes, in addition to butyl acrylate, methyl acrylate, ethyl acrylate, propyl acrylate, hexyl acrylate, and 2-ethylhexyl acrylate. The crosslinking monomer includes, in addition to butylene diacrylate, a vinyl compound such as butylene dimethacrylate, ethylene glycol diacrylate, ethylene glycol dimethacrylate, butylene glycol diacrylate, butylene glycol dimethacrylate, oligoethylene glycol diacrylate, trimethylol propane, trimethylol propane diacrylate, trimethylol propane dimethacrylate, and trimethylol propane trimethacrylate; and an allyl compound such as allyl acrylate, allyl methacrylate, diallyl maleate, dially fumarate, diallyl itaconate, monoallyl maleate, monoallyl fumarate, and triallyl cyanurate.

The silicon-base elastomer is produced by polymerizing an organosiloxane monomer, where the organosiloxane includes hexamethyl tricyclosiloxane, octamethyl cyclosiloxane, decamethyl pentacyclosiloxane, dodecamethyl hexacyclosiloxane, trimethyl triphenylsiloxane, tetramethyl phenylcyclotetrasiloxane, and octaphenyl cyclotetrasiloxane.

For the constituent component of acrylic-base elastomer in the inner layer, a vinyl monomer and/or copolymer may be used, but an acrylic-base elastomer containing no conjugate diene such as a butadiene is preferably used because of the resistance to heat and the storage stability.

The shell layer formed with the glass resin of the acrylic-base copolymer is made of a vinyl-base (co)polymer having a glycidyl group. The vinyl-base (co)polymer is produced by copolymerizing at least one monomer selected from an aromatic vinyl monomer, a vinylcyanide monomer, a methacrylic acid ester-base monomer, and an acrylic acid ester-base monomer, with a vinyl-base monomer having a glycidyl group. For the vinyl-base monomer having a glycidyl group, an α,β-unsaturated carboxylic acid glycidyl ester or a glycidyl ether compound thereof is preferably used, and glycidyl methacrylate is generally used as the typical compound. The present invention is not limited in method and amount for introducing the glycidyl group. Any vinyl-base (co)polymer having a glycidyl group is preferably used.

The rubber layer and the shell layer in such a core shell type compound are generally bound by a graft bond. The rubber layer is supplied with a graft crossing agent reactive with the shell layer to provide the rubber layer with a reactive group, followed by forming the shell layer to obtain the graft copolymer. For the graft crossing agent, organosiloxane having a vinyl bond or organosiloxane having a thiol is used in a silicone-base rubber. Acroxy siloxane, methacryloxy siloxane and vinylsiloxane are preferably used.

For the acrylic-base copolymer having a glycidyl group, a core shell type compound having an average particle size of 1.0 μm or less is preferable. The compound having that of more than 1.0 μm in some cases does not provide a sufficient effect to improve resistance to heat shock.

The α-olefin.α,β-unsaturated carboxylic acid (ester). α,β-unsaturated carboxylic acid glycidylester-based ternary polymer, which is another elastomer used for (C) the component in the present invention, will be described.

The α-olefin.α,β-unsaturated carboxylic acid (ester). α,β-unsaturated carboxylic acid glycidylester-based ternary polymer used in the present invention is a copolymer of α-olefin, α,β-unsaturated carboxylic acid (ester), and α,β-unsaturated carboxylic acid glycidylester.

The α-olefin includes ethylene, propylene, and butylene, and ethylene is preferable. The α,β-unsaturated carboxylic acid ester includes methyl acrylate, ethyl acrylate, and butyl acrylate, and any of them can be preferably used. The α,β-unsaturated carboxylic acid glycidylester includes acrylic acid glycidyl ester, methacrylic acid glycidyl ester, and ethacrylic acid glycidyl ester, and any of them can be preferably used.

The copolymer of α-olefin, α,β-unsaturated carboxylic acid (ester), and α,β-unsaturated carboxylic acid glycidylester can be obtained through copolymerization by a well known radical polymerization reaction. In α-olefin, α,β-unsaturated carboxylic acid (ester), and α,β-unsaturated carboxylic acid glycidylester, preferably α-olefin has a rate of 50 to 88% by weight, α,β-unsaturated carboxylic acid (ester) has that of 10 to 40% by weight, and α,β-unsaturated carboxylic acid glycidylester has that of 2 to 20% by weight.

For the α-olefin.α,β-unsaturated carboxylic acid (ester). α,β-unsaturated carboxylic acid glycidylester-based ternary copolymer, any of the graft, block, and random copolymer can be used. The ternary copolymer is preferably used where the α-olefin is block (co)polymerized, while the α,β-unsaturated carboxylic acid (ester) and the α,β-unsaturated carboxylic acid glycidylester are random copolymerized.

The elastomer of (C) the component, which is selected from the acrylic-based copolymer having a glycidyl group and/or the α-olefin.α,β-unsaturated carboxylic acid (ester). α,β-unsaturated carboxylic acid glycidylester-based ternary polymer, is comprised at a content of 5 to 30 parts by weight relative to 100 parts by weight of (A) the polybutylene terephthalate resin. The elastomer, if comprised at a content of less than the range, is not found out to improve resistance to heat shock, and, if comprised at that of more than the range, lowers remarkably vibration welding to an undesired result.

For (D) the glass fiber used in the present invention, any known glass fiber is preferably used, and the present invention is not limited in diameter, shape such as cylinder and cocoon, length and glass cutting method such as chopped strand and roving of the glass fiber. Further, the present invention is not limited in kind of glass, and E glass or corrosion-resistant glass containing zirconium is preferably used in view of quality.

In order to improve interfacial quality between the glass fiber and the resin matrix, a glass fiber surface-treated with an organic improver such as an aminosilane compound and an epoxy compound is preferably used. The glass fiber to use is preferably treated with 1% by weight or more of the organic improver shown in terms of a heating loss.

(D) the glass fiber is used at a content of 60 to 150 parts by weight relative to 100 parts by weight of (A) the polybutylene terephthalate resin. The glass fiber, if used at that of less than 60 parts by weight, brings a large change in linear expansion due to thermal cycle and an undesired effect on resistance to heat shock. The glass fiber, if used at that of more than 150 parts by weight, lowers the allowable amount of strain of a material and brings an undesired effect on resistance to heat shock. The content is preferably 60 to 130 parts by weight, particularly preferably 60 to 120 parts by weight.

The composition of the present invention may further comprises (E) boron nitrite. The boron nitrite has preferably an average particle size of 0.05 to 1 μm. (E) the boron nitrite is used at a content of 1 part by weight or less relative to 100 parts by weight of (A) the polybutylene terephthalate resin. The boron nitrite, if used at that of more than the range, lowers vibration welding to an undesired result.

The composition of the present invention may further comprises a known substance generally added in a thermoplastic resin and a thermosetting resin, that is, a stabilizer such as an antioxidant, a heat resistant stabilizer, and an ultraviolet absorptive agent, an antistatic agent, a coloring agent such as a dyestuff and a pigment, a lubricant, a plasticizer, a crystallization promoter, and a crystal core agent in order to provide the composition with desired performances depending on the objects.

The resin composition used in the present invention can be easily prepared using facilities and processes generally used in a conventional method for preparing a resin composition. The method includes: 1) a method wherein components are mixed together, kneaded and extruded through a single screw extruder or a twin screw extruder to prepare a pellet, followed by molding; 2) a method wherein pellets having different compositions are prepared, mixed at a specified rate, and molded to provide a molded product with a desired composition; and 3) a method wherein one or more of components are directly charged into a molding machine. Any of them can be used in the present invention. A method wherein a part of the resin component is pulverized to a fine powder, which is then mixed with the other components is preferred to add these components uniformly.

The resin composition of the present invention, which has properties of resin pellets prepared by melting and kneading, has preferably a melt viscosity ($260°$ C., $100\ sec^{-1}$) of 0.20 to 0.35 kPa and a crystallization temperature of $192°$ C. or less. The composition, if it has a melt viscosity of less than the range, lowers remarkably vibration welding, and, if it has that of more than the range, worsens moldability to a practically undesired result. The composition, if it has a crystallization temperature of more than the range, lowers remarkably vibration welding to an undesired result.

A molded product can be easily molded from the resin composition of the present invention by a conventional molding method such as extrusion molding and injection molding. A conventional method may be used for vibration welding of the molded product of the present invention.

EXAMPLES

The present invention will be described in more detail with reference to the following Examples. The present invention, however, is not limited to these Examples.

Examples 1 to 7, Comparative Examples 1 to 7

The components listed in Tables 1 and 2 were weighed, dry blended, and melt kneaded using the twin screw extruder TEX-30 made by Japan Steel Works to prepare a pellet (cylinder temperature $260°$ C., output 15 kg/h, screw rotation number 150 rpm). Then, the pellet was processed to produce a test piece, which was subjected to determination for various properties. The results are shown collectively in Tables 1 and 2.

Details of the components used and determination methods to evaluate properties are as follows.

(A) PBT resin: made by Polyplastics KK, IV=0.69.

(B) Modified polyester:
  (B-1) Isophthalic acid modified PET: IFG-8L, made by Kanebo KK, IV=0.80, modification amount 12 mol %.
  (B-2) Isophthalic acid modified PBT: made by Polyplastics KK, IV=0.74, modification amount 12.5 mol %.
  (B-3) Isophthalic acid modified PBT: made by Polyplastics KK, IV=0.74, modification amount 25 mol %.
  (B'-1) PET resin: EFG-10, made by Kanebo KK.

(C) Elastomer component:
  (C-1) Glycidyl group-containing acrylic-base core shell polymer: ELX2314, made by Rohm and Haas.
  (C-2) Glycidyl group-containing acrylic-base core shell polymer: D400R, made by Atfina.
  (C-3) Ethylene/methylacrylate (MA)/glycidyl methacrylate (GMA) copolymer: A8900 (GMA=8% by weight, MA=30% by weight), made by Atfina.
  (C-4) Ethylene/methylacrylate/glycidyl methacrylate copolymer: BF-7M (GMA=6% by weight, MA=25% by weight), made by Sumitomo Chemicals KK.
  (C'-1) Acrylic-base core shell polymer: EXL2311, made by Rohm and Haas.
  (C'-2) Ethylene/glycidyl methacrylate copolymer: BF-2C (GMA=6% by weight), made by Sumitomo Chemicals KK.

(D) Glass fiber: T127, made by Nippon Electric Glass KK.

(E) Boron nitrite: made by Denki Kagaku Kogyo KK.

<Melt Viscosity>

A pellet was dried under a condition of $140°$ C.×3 h, and determined for melt viscosity (kPa·sec) by the Capirograph Rheometer made by Toyo Seiki KK under a condition: orifice diameter=1.0 mm, barrel diameter=9.55 mm, cylinder temperature=$260°$ C., shear rate=$100\ sec^{-1}$.

<Crystallization Temperature>

Using the DSC7 made by Perkin Elmer, a pellet was heated from initial temperature=$50°$ C.×1 min to $280°$ C.×1 min at a rate of $\Delta 10°$ C./min, and determined for the peak value of crystallization temperature detected at temperature lowering at a rate of $A10°$ C./min.

<Vibration Welding (Welding Strength)>

Figure 1:
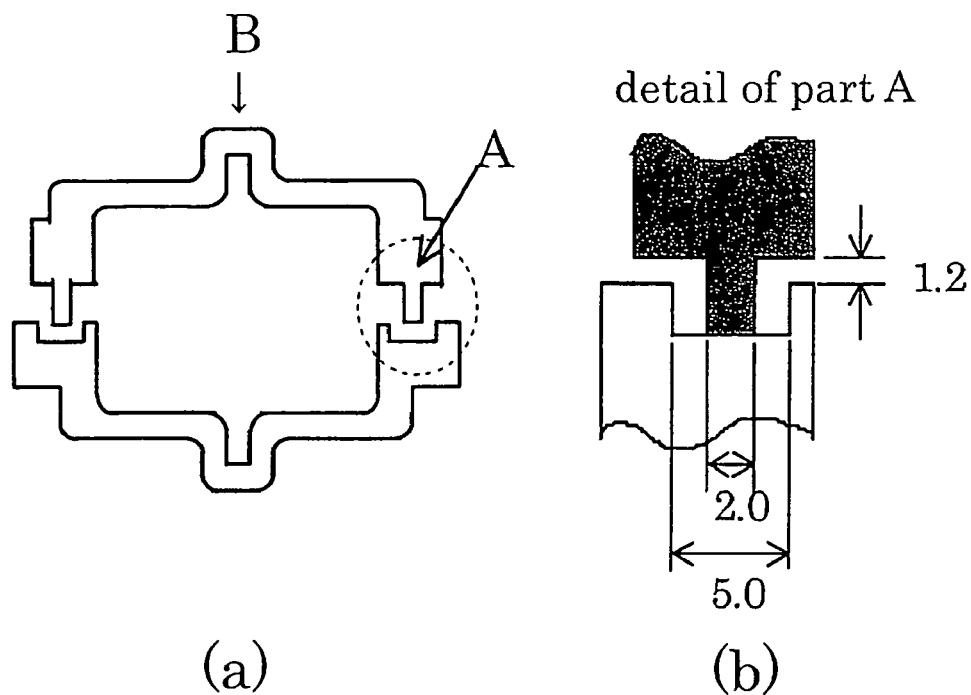
FIG. 1 is a drawing showing a test piece used to evaluate vibration welding in Example. (a) is sectional view, and (b) is detail showing the spot (part A) where vibration welding takes place. The numerals in Figure have units of mm.

Using the injection molding machine J75SA made by Japan Steel Works, a test piece comprising two members having a sectional profile shown FIG. 1 was molded under a condition: cylinder temperature=$260°$ C., injection speed=1 m/min, holding pressure=60 MPa, mold temperature=$80°$ C., injection time=25 sec, cooling time=10 sec.

Using the vibration welding machine Orbital 100 made by Japan Emerson KK, the two members were subjected to vibration welding between their end faces (part A at two locations) under a condition: frequency=203 Hz, actual pressure=1.5 Bar, welding width=1.0 mm, amplitude=0.8 mm. After welding, the test piece was cut in part, punching shear strength was then measured by a universal tester (Tensilon UTA-50kN made by Orientec KK) at a speed of 5.0 mm/min to be used as the vibration welding strength.

<Vibration Welding (Processability)>

Burr and abrasion powder generated at welding process for above-mentioned vibration welding strength measurement were visually checked and judged to rank into three levels as follows: (good) ○-Δ-X (bad).

<Vibration Welding (Airtight after Testing on Resistance to HS)>

Using the thermal shock tester made by Espec KK, the molded product obtained in the vibration welding (Welding strength) test was subjected to heat shock treatment by a cycle of between −40° C.×1 hour and 140° C.×1 hour to confirm the airtight of the welding test piece, and judged to rank into three levels as follows: (good) ○-Δ-X (bad). A ventilation hole was drilled to part B and air at 0.2 MPa was passed through this hole in the water to confirm the airtight.

<Moldability>

Using the injection molding machine J75SA made by Japan Steel Works, the test piece shown in FIG. 1 was injection molded under a condition: cylinder temperature=250° C., injection speed=1 m/min, and mold temperature=80° C., to judge the moldability in terms of short shot and poor mold release as index, and judged to rank into three levels as follows: (good) ○-Δ-X (bad).

<Resistance to Heat Shock of Insert Molded Product>

Figure 2:
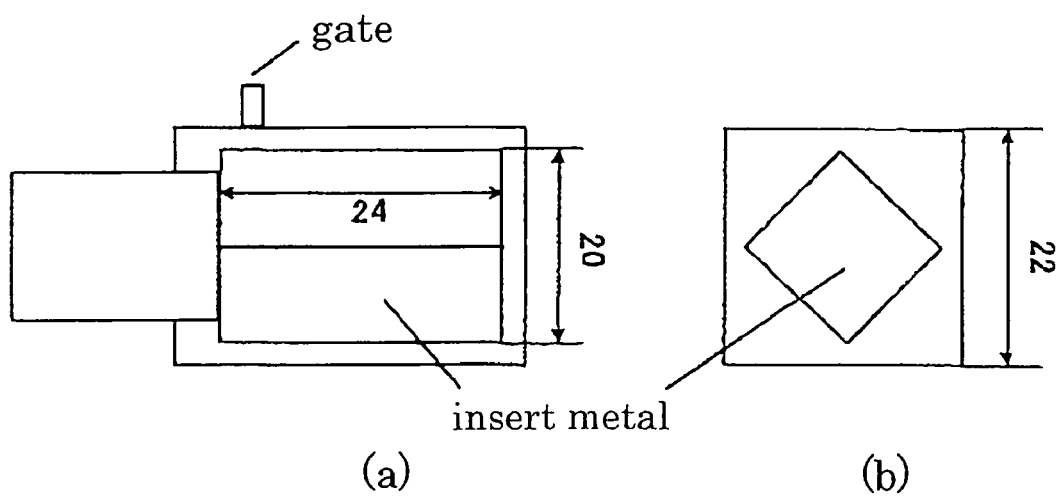
FIG. 2 is a drawing showing a metal insert molded product used to evaluate resistance to heat shock in Example. (a) is front view, and (b) is side view. The numerals in Fig. have units of mm.

Using the injection molding machine J75SA made by Japan Steel Works, a metal insert molded product shown in FIG. 2 was insert-molded under a condition: cylinder temperature=250° C., injection speed=1 m/min, holding pressure=60 MPa, mold temperature=80° C., injection time=25 sec, cooling time=10 sec.

Using the thermal shock tester or thermal shock environmental chamber made by Espec KK, the insert molded product was subjected to heat shock treatment by a cycle of between −40° C.×1 hour and 140° C.×1 hour. Every 20 cycles, the insert molded product was taken out to observe visually for changes in appearance. For samples which caused a destruction, the number of cycles till taken out was referred to as the number of times of failures. The test was conducted by M=5 to calculate an average of number of times of failures according to the Weibull function.

TABLE 1

| | | Examples | | | | | | |
|---|---|---|---|---|---|---|---|---|
| | | 1 | 2 | 3 | 4 | 5 | 6 | 7 |
| (A) PBT | | 100 | 100 | 100 | 100 | 100 | 100 | 100 |
| (B) Modified polyester | B-1 | | | | | 32 | | |
| | B-2 | | | | | | 32 | |
| | B-3 | 32 | 32 | 32 | 32 | | | 32 |
| | B'-1 | | | | | | | |
| (C) Elastomer | C-1 | 17 | | | | | | |
| | C-2 | | 17 | | | | | |
| | C-3 | | | 17 | | 17 | 17 | 17 |
| | C-4 | | | | 17 | | | |
| | C'-1 | | | | | | | |
| | C'-2 | | | | | | | |
| (D) Glass fiber | | 64 | 64 | 64 | 64 | 64 | 64 | 64 |
| (E) Boron nitride | | | | | | | | 0.02 |
| Melt viscosity | kPa · sec | 0.25 | 0.26 | 0.23 | 0.22 | 0.24 | 0.24 | 0.23 |
| Crystallization temperature | ° C. | 185 | 185 | 185 | 185 | 188 | 190 | 187 |
| Vibration welding (welding strength) | N | 4500 | 4450 | 4250 | 4000 | 4250 | 4200 | 4250 |
| Vibration welding (processability) | | ○ | ○ | ○ | ○ | ○ | ○ | ○ |
| Vibration welding (airtight after test of resistance to HS) | | ○ | ○ | ○ | ○ | ○ | ○ | ○ |
| Moldability | | ○ | ○ | ○ | ○ | ○ | ○ | ○ |
| Resistance to heat shock of insert molded product | cycles | 260 | 300 | 220 | 180 | 200 | 180 | 200 |

TABLE 2

| | | Comparative Examples | | | | | | |
|---|---|---|---|---|---|---|---|---|
| | | 1 | 2 | 3 | 4 | 5 | 6 | 7 |
| (A) PBT | | 100 | 100 | 100 | 100 | 100 | 100 | 100 |
| (B) Modified polyester | B-1 | | | | | | 38 | |
| | B-2 | | | | | | | |
| | B-3 | | 32 | 32 | | 121 | | 32 |
| | B'-1 | | | | 32 | | | |
| (C) Elastomer | C-1 | 17 | | | | | | |
| | C-2 | | | | | | | |
| | C-3 | | | | | 17 | 29 | 38 | 17 |
| | C-4 | | | | | | | |
| | C'-1 | | 17 | | | | | |
| | C'-2 | | | 17 | | | | |
| (D) Glass fiber | | 63 | 64 | 64 | 64 | 107 | 75 | 50 |
| (E) Boron nitride | | | | | | | | |
| Melt viscosity | kPa · sec | 0.27 | 0.24 | 0.26 | 0.28 | 0.20 | 0.26 | 0.15 |
| Crystallization temperature | ° C. | 195 | 186 | 186 | 195 | 183 | 184 | 192 |
| Vibration welding (welding strength) | N | 3900 | 3700 | 2500 | 2800 | 4600 | 2200 | 3600 |

TABLE 2-continued

|  |  | Comparative Examples | | | | | | |
|---|---|---|---|---|---|---|---|---|
|  |  | 1 | 2 | 3 | 4 | 5 | 6 | 7 |
| Vibration welding (processability) |  | ○ | x | ○ | x | x | x | ○ |
| Vibration welding (airtight after test of resistance to HS) |  | x | x | x | x | ○ | x | ○ |
| Moldability |  | ○ | ○ | ○ | ○ | x | x | ○ |
| Resistance to heat shock of insert molded product | cycles | 300 | 250 | 60 | 140 | 260 | 100 | 130 |

The invention claimed is:

1. A polybutylene terephthalate resin composition for vibration welding, comprising (A) 100 parts by weight of a polybutylene terephthalate resin obtained by the polycondensation of terephthalic acid or ester derivative thereof with an alkylene glycol having 4 carbon atoms or an ester derivative thereof; (B) 20 to 100 parts by weight of a modified polyester copolymer comprising 5 to 30% by mole of a comonomer; (C) 5 to 30 parts by weight of an elastomer selected from the group consisting of an acrylic-base copolymer having a glycidyl group and a terpolymer of an α-olefin, an α,β-unsaturated carboxylic acid or an ester thereof and an α,β-unsaturated carboxylic glycidyl ester; and (D) 60 to 150 parts by weight of glass fiber.

2. The polybutylene terephthalate resin composition for vibration welding according to claim 1, wherein (B) the modified polyester copolymer comprising 5 to 30% by mole of a comonomer is at least one selected from the group consisting of an isophthalic acid-modified polyethylene terephthalate and an isophthalic acid-modified polybutylene terephthalate.

3. The polybutylene terephthalate resin composition for vibration welding according to claim 1, further comprising (E) boron nitride.

4. A molded article produced by vibration welding a molded product of a polybutylene terephthalate resin composition comprising (A) 100 parts by weight of a polybutylene terephthalate resin obtained by the polycondensation of terephthalic acid or ester derivative thereof with an alkylene glycol having 4 carbon atoms or an ester derivative thereof; (B) 20 to 100 parts by weight of a modified polyester copolymer comprising 5 to 30% by mole of a comonomer; (C) 5 to 30 parts by weight of an elastomer selected from the group consisting of an acrylic-base copolymer having a glycidyl group and a terpolymer of an α-olefin, an α,β-unsaturated carboxylic acid or an ester thereof and an α,β-unsaturated carboxylic glycidyl ester; and (D) 60 to 150 parts by weight of glass fiber.

5. The molded article produced by vibration welding according to claim 4, wherein (B) is at least one selected from the group consisting of an isophthalic acid-modified polyethylene terephthalate and an isophthalic acid-modified polybutylene terephthalate.

6. The molded article produced by vibration welding according to claim 4, wherein elastomer (C) is an acrylic-base copolymer having a glycidal group.

7. The molded article produced by vibration welding according to claim 4, wherein elastomer (C) is a terpolymer of an α-olefin, an α,β-unsaturated carboxylic acid or an ester thereof and an α,β-unsaturated carboxylic glycidyl ester.

8. The molded article produced by vibration welding according to claim 4, wherein said polybutylene terephthalate resin composition further comprises (E) boron nitride.

* * * * *

UNITED STATES PATENT AND TRADEMARK OFFICE
CERTIFICATE OF CORRECTION

| | | |
|---|---|---|
| PATENT NO. | : 7,652,079 B2 | Page 1 of 1 |
| APPLICATION NO. | : 11/298653 | |
| DATED | : January 26, 2010 | |
| INVENTOR(S) | : Takayama et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1079 days.

Signed and Sealed this

Twenty-third Day of November, 2010

David J. Kappos
*Director of the United States Patent and Trademark Office*